United States Patent
Eskandari et al.

(10) Patent No.: US 6,260,096 B1
(45) Date of Patent: Jul. 10, 2001

(54) READ LATENCY ACROSS A BRIDGE

(75) Inventors: Nick G. Eskandari, Chandler; Bineet Thaker, Tempe, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/227,995

(22) Filed: Jan. 8, 1999

(51) Int. Cl.[7] .................................................. G06F 13/00
(52) U.S. Cl. ............................. 710/129; 710/52; 710/58
(58) Field of Search .................................. 710/126, 128, 710/129, 52, 57–58, 130

(56) References Cited

U.S. PATENT DOCUMENTS

| | | | |
|---|---|---|---|
| 5,339,449 | * | 8/1994 | Karger et al. . |
| 5,732,094 | * | 3/1998 | Petersen et al. ..................... 714/805 |
| 5,941,964 | * | 8/1999 | Young et al. ........................ 710/100 |
| 5,974,456 | * | 10/1999 | Naghshineh et al. ................ 709/223 |

* cited by examiner

*Primary Examiner*—Ario Etienne
(74) *Attorney, Agent, or Firm*—Blakely, Sokoloff, Taylor & Zafman LLP

(57) ABSTRACT

A method of handling read transactions to improve latency and promote streaming across a bridge. When an initiator returns to retrieve the read data associated with a previously enqueued transaction, the bridge will insert one or more wait states if the enqueued transaction is being mastered and no data has been received in a buffer of the bridge from the target, or if some but not a sufficient amount of data has been received from the target. The bridge continues to hold the initiator until the buffer contains sufficient read data whereupon the bridge will deliver the read data from the buffer to the initiator.

16 Claims, 3 Drawing Sheets

READ LATENCY ACROSS A BRIDGE

BACKGROUND INFORMATION

1. Field of the Invention

The invention is generally related to computer systems and more particularly to read transactions across bridges.

2. Description of the Related Art

The performance of computer systems can be enhanced through the use of multiple buses that allow a larger number of devices to become part of the system. Devices on one bus can communicate with devices on a physically separate bus through a bridge 108 as shown in the computer system 100 of FIG. 1. Transactions cross the bridge are requested by an initiator 102 that is coupled to an initiating bus 110 and are directed at a target 104 coupled to a target bus 114. As the requested data is received from the target one portion at a time, it is stored in the buffer 120 before being forwarded to the initiator.

One type of transaction that is particularly common in such computer systems is the delayed read transaction performed in systems that comply with the popular Peripheral Component Interconnect (PCI) Local Bus Specification, Revision 2.1, Oct. 21, 1994, and with the PCI to PCI Bridge Architecture Specification, Revision 1.0, Apr. 5, 1994, both published by the PCI Special Interest Group, Portland, Oreg.

Typically, after an initial PCI delayed read transaction directed at the target 104 is requested on the first bus 110, the bridge claims the transaction by latching address and command type information associated with this initial request. This information is indicated as transaction information TR in register 122. The bridge then immediately signals a Retry termination to the initiator 102. The Retry signals the initiator 102 to return at a later time for the requested data. The transaction is now enqueued and the bridge 108 attempts to master the enqueued transaction on the target bus 114 by requesting read data from the target 104 at the address specified in the TR.

As the requested data 120a, 120b, . . . is received from the target 104 one portion at a time, it is stored in the buffer 120 until the initiator 102 returns. When the initiator 102 returns by requesting a read transaction that matches the enqueued transaction, and some or all of the requested data is now available in the buffer 120, the bridge delivers the data 120a, 120b . . . to the initiator 102 one portion at a time. If, however, none of the requested data is available in the buffer 120 when the initiator 102 returns, the bridge signals another Retry termination. Repeated requests by the initiator continue to invoke Retry terminations by the bridge so long as the buffer 120 does not contain any of the requested data. This may occur, for instance, if the target 104 or the target bus 114 is busy such that the read data cannot be accessed by the second interface 132 of the bridge.

The above-described conventional methodology of signaling a Retry each time the buffer has no data when the initiator returns adversely affects latency which is an important measure of performance in computer systems. Latency here is defined as the delay, from the time of the initial request, in delivering a portion of the requested read data to the initiator. For instance, consider the situation where some of the requested read data arrives into an empty buffer 120 soon after the initiator 102 is signaled a Retry. The bridge must now wait for the initiator 102 to return before the bridge can deliver any of the recently received read data. This delay increases latency. Moreover, this delay may become longer if transactions other than the enqueued delayed read transaction keep the initiating bus 110 busy, thus preventing the initiator from returning to fetch the read data from the buffer. Therefore, what is desirable is a technique for improving latency in such a situation.

SUMMARY

Accordingly, an embodiment of the invention is directed at a method of handling transactions across a bridge by: receiving an initial request for an initial read transaction from an initiator, receiving a subsequent request for a subsequent read transaction from the initiator, and signaling one or more wait states to the initiator in response to the subsequent request provided the initial transaction is being mastered.

These as well as advantages and features of other embodiments of the invention will be more apparent by referring to the drawings, the written description, and the claims below.

DETAILED DESCRIPTION

In an embodiment of the invention, the initiator is "held" so that read data can be delivered as soon as it is received by the bridge, thus reducing the latency. Doing so also promotes data streaming across the bridge as read data for the same transaction is being delivered to the initiator from the buffer at the same time as being received from the target. The method may be extended to a number of read transactions that are simultaneously pending in a bridge having multiple buffers.

Figure 1:
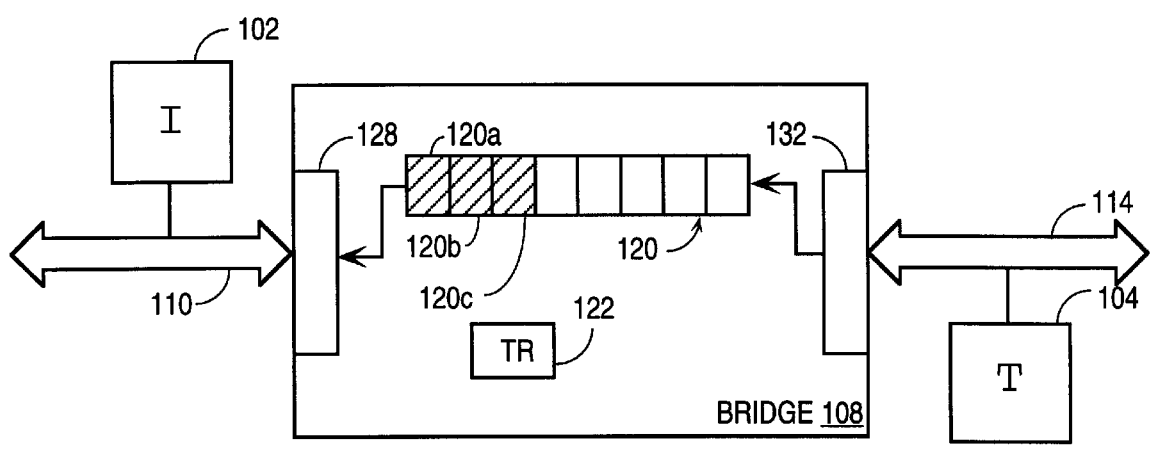
FIG. 1 illustrates a functional block diagram of a prior art bridge.
Figure 2:
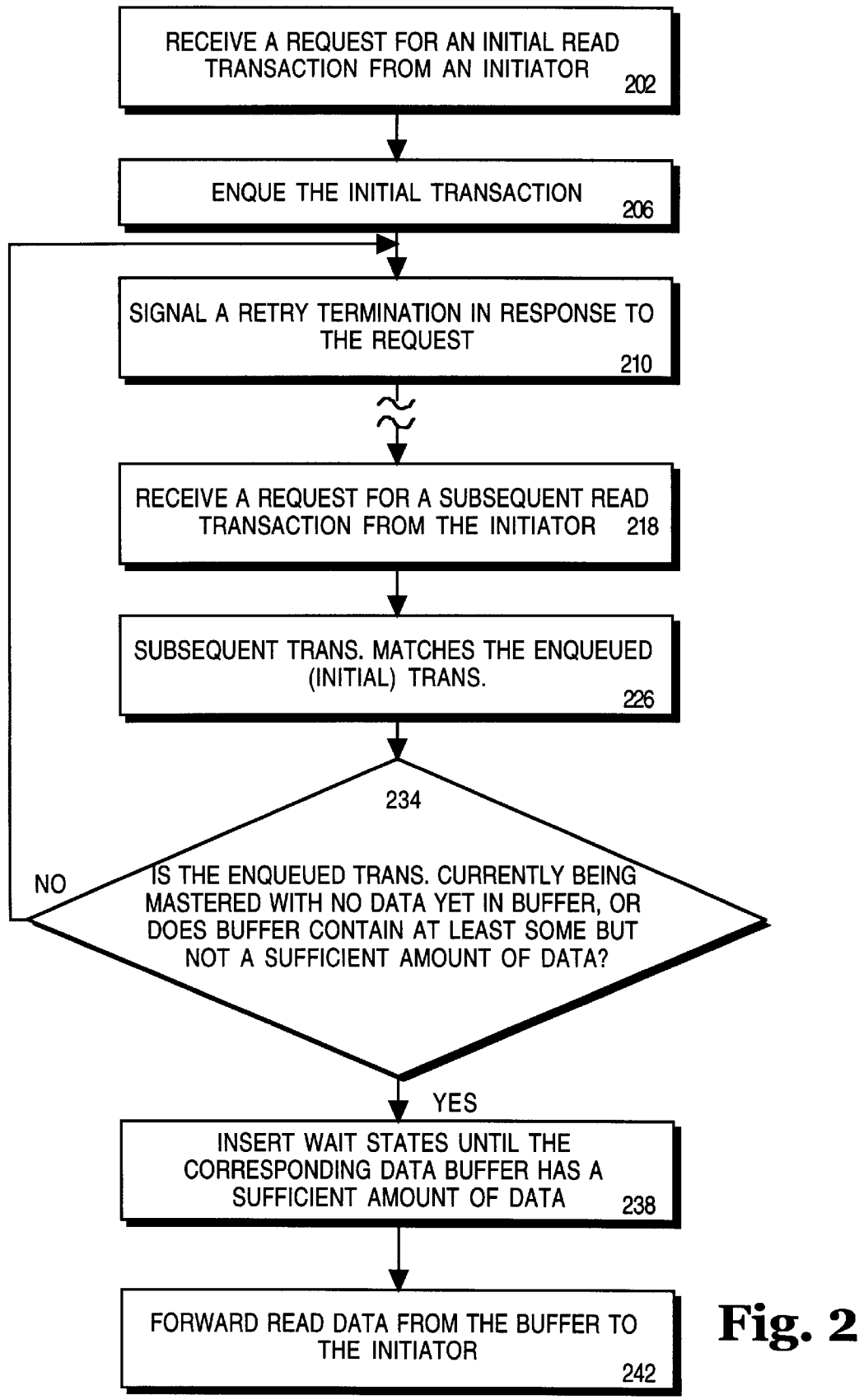
FIG. 2 is a flow diagram of steps performed to improve read latency according to an embodiment of the invention.

FIG. 2 illustrates a flow diagram of operations performed by a bridge in an embodiment of the invention for handling read transactions. For the following description, the reader is also referred to the computer system 100 in FIG. 1. In this particular embodiment, the read transaction is the PCI Delayed Read transaction. However, the discussion below may equally apply to certain other read transactions. More information concerning PCI read transactions can be obtained from *i960 Rx I/O Microprocessor Developers' Manual*, Intel Corporation, April, 1997 (order number 272736-002), Chapter 15, PCI-to-PCI Bridge Unit. Operation begins with step 202 in which an initial request for a transaction is received from the initiator 102. If the transaction is one that falls within the address space of the first interface 128 of the bridge 108, the requested transaction is claimed and the transaction information is latched. The request is otherwise ignored by the bridge. The bridge enques the initial transaction by assigning it to an available buffer 120, and then signals a Retry termination to the initiator as in step 210.

The bridge then attempts to master the enqueued transaction by acquiring the target bus 114. Once the second target 114 has been acquired by the second interface 132, the bridge requests read data from the target 104 at the address that was specified in the initial request received from the initiator 102. Any read data associated with the enqueued transaction that is thereafter received from the target will be stored in the assigned data buffer 120 while awaiting the initiator to return.

When the bridge 108 receives a subsequent read transaction request through its first interface 128 in step 218, operation proceeds with step 226 in which the bridge attempts to match the subsequent transaction with an enqueued transaction. If there is no match, then the bridge may enqueue the subsequent transaction. If, however, the subsequent transaction matches an enqueued transaction, and assuming for this example that the matching enqueued transaction is the one having transaction information TR (see FIG. 1), then operation proceeds with step 234. In step 234, the bridge determines whether the matching enqueued transaction is currently being mastered but the buffer 120 does not yet contain any read data, or at least some but not a sufficient amount of the requested read data has been received by the bridge and stored in the data buffer 120. If neither condition is true then a Retry is signaled to the initiator 102. This is repeated for all other subsequent transactions, as shown in FIG. 2, until a condition in step 234 is satisfied.

One of the conditions in step 234 is that an enqueued transaction is being mastered. This means the enqueued transaction, through the second interface 132, owns the target bus 114. For instance, ownership can refer to the bridge sending a read address on the target bus 114, or the target 104 has responded and is inserting wait states or the target 104 is transferring data to the bridge. Other events can be selected to indicate bus ownership, as recognized by those of ordinary skill in the art.

The other condition in step 234 that triggers the signaling of wait states is that at least some of the requested read data has been previously received from the target 104 and is stored in the buffer 120. This condition can occur if the bridge is configured such that a threshold amount of data is required to be present in the buffer 120 before any of it can be delivered. The threshold amount has not yet been received from the target 104, perhaps because the target bus 114 has been busy with other transactions.

Once a condition in step 234 is satisfied, the bridge inserts wait states on the initiating bus 110 in response to the subsequent request until the data buffer 120 has a sufficient amount of data, as in step 238. Of course, the initiator may be held using techniques other than inserting wait states which may similarly prevent the termination of the subsequent transaction on the initiating bus 110, depending on the particular read transaction or bus protocol being used. When the buffer 120 has filled with a sufficient amount of data as in step 242, data can be delivered from the buffer to the initiator 102 in response to the pending subsequent transaction request.

By holding the initiator 102 (e.g., through the use of wait states) while the data buffer 120 has no data to be delivered, the bridge in a particular embodiment helps reduce latency by ensuring that additional read data can be immediately delivered to the initiator 102 as soon as it is received from the target 104. In addition, data streaming is facilitated if the target 104 continues to deliver additional read data for the matching enqueued transaction while, at the same time, read data (for the same transaction) is being delivered from the buffer to the initiator.

Data streaming may also be promoted by holding the initiator 102 while the data buffer 120 has some, but not a sufficient amount of the requested read data. The sufficient amount of data may be any suitable number of data words as determined by one of ordinary skill in the art. The amount may be determined prior to the bridge 108 receiving the initial request. The amount may be set by a user programmable register (not shown) in the bridge. The use of such a register with read transactions is treated in more detail in Eskandari and Davis' pending U.S. patent application entitled "Trigger Points for Performance Optimization in Bus-to-Bus Bridges", Ser. No. 09/034,624, filed Mar. 4, 1998. The optimal amount of read data which must be present in the buffer 120 before any of the read data can be delivered should be determined in view of the expected data traffic across the bridge and over the initiating and target buses while the computer system 100 is operating in its intended application.

It should be noted that if the enqueued transaction TR has not been mastered, or the requested read data in the buffer 120 has not reached its threshold level, after a certain period of time has elapsed since the subsequent request was received, then the bridge 108 may release the initiator 102 by signaling a Retry termination. On the other hand, a Completion termination is signaled by the bridge once all requested read data for the enqueued transaction TR has been delivered to the initiator. Of course, other terminations such as Abort may be signaled by the bridge if needed to prematurely end the subsequent transaction prior to the transfer of all requested read data.

For an embodiment of the invention that complies with the PCI specification, the initial and subsequent transactions described above are PCI delayed read transactions such as memory read, memory read line (MRL), and memory read multiple (MRM). These may be directed at targets such as memory devices or memory-mapped PCI resources on the target bus 114. The amount of read data that the bridge requests from the target and stores in the buffer depends in part on the PCI command type received in the initial transaction. Also, in certain embodiments, in particular the PCI embodiment, the same initiator may "repeat" the initial request for the same read when requesting the subsequent transaction.

Figure 3:
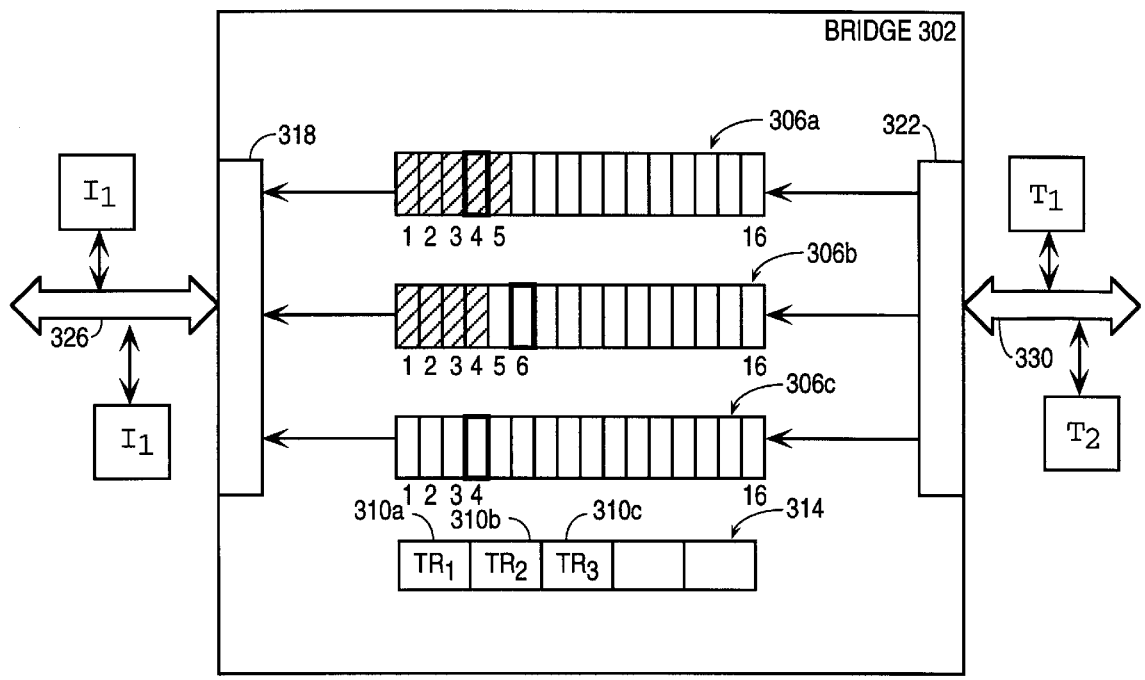
FIG. 3 illustrates a block diagram of a bridge having multiple read data buffers according to an embodiment of the invention.

FIG. 3 shows another embodiment of the invention as a conventional bus-to-bus bridge 302. In this embodiment, the bridge 302 comprises a number of data queues, 306a, 306b, . . . where each data queue corresponds to a transaction slot 310a, 310b, . . . in a transaction queue 314. The data queues are first-in-first-out (FIFO) buffers that are coupled between a primary interface 318 and a secondary interface 322 of the bridge 302. The transfer of data in and out of a data queue can occur simultaneously. The first and second interfaces can operate independently to process the same or different transactions simultaneously. The interfaces are coupled to their respective primary bus 326 and secondary bus 330. Bus resources or devices such as initiators and $I_2$ and targets $T_1$ and $T_2$ reside on the buses. The initiator $I_1$ may be a host processor and the target $T_1$ may be a disk controller. Other initiator target pairs are, of course, possible. The data queues accept read data from a target on the secondary bus 330. The data may then be delivered to an initiator on the primary bus 326. Although three data queues are shown, one of ordinary skill in the art will recognize that a fewer or greater number may be used if needed to meet the performance requirements of the overall system.

The examples below illustrate three different scenarios for how a subsequent request and transaction that follows an initial request and transaction may be handled according to an embodiment of the invention, depending on how the bridge 302 is configured and on the contents of the corresponding data queue 306a, 306b, . . . FIG. 3 shows the contents of the data queues at the time the subsequent request is received by the primary interface 318. Three transactions are pending in the bridge 302. These are the three enqueued transactions $TR_1$, $TR_2$, and $TR_3$.

$TR_1$ has previously been mastered by the secondary interface 322 and as a result has five data words stored in its corresponding data queue 306a when the subsequent request is received. For $TR_1$, the threshold or "sufficient amount" of read data has been predetermined to be four words as indicated by the emphasized fourth slot in the data queue 306a. Thus, when the bridge 302 receives a subsequent request from an initiator on the primary bus 326 that matches the enqueued transaction $TR_1$, read data from the data queue 306a will be delivered, beginning with the first word, through the primary interface 318. This occurs regardless of whether $TR_1$ is being mastered at the time the subsequent request is received.

$TR_2$ has four words stored in its data queue 306b when the subsequent request is received. If the subsequent transaction matches $TR_2$, the bridge 302 signals a wait state to the initiator in response to the subsequent request, through the primary interface 318. The bridge 302 continues to signal wait states until additional data is received from the target such that the data queue 306b contains at least six words, which is the threshold amount for $TR_2$. Thereafter, read data starting with the first word in the data queue 306b is transferred through the primary interface 318 and onto the primary bus 326 to be delivered to the initiator. The signaling of wait states while the bridge waits for the data queue 306b to sufficiently fill occurs prior to the bridge terminating the subsequent transaction.

$TR_3$ has no data in its data queue 306c when the subsequent request is received. If the subsequent transaction matches $TR_3$, then the bridge inserts wait states in response to the subsequent transaction request provided that $TR_3$ is being mastered by the secondary interface 322. As additional portions of read data are received from the target, they may be immediately delivered to the initiator after being buffered in the data queue 306c. This causes streaming to occur as read data for $TR_3$ is being forwarded to the initiator at the same time as other portions are being received from the target.

Figure 4:
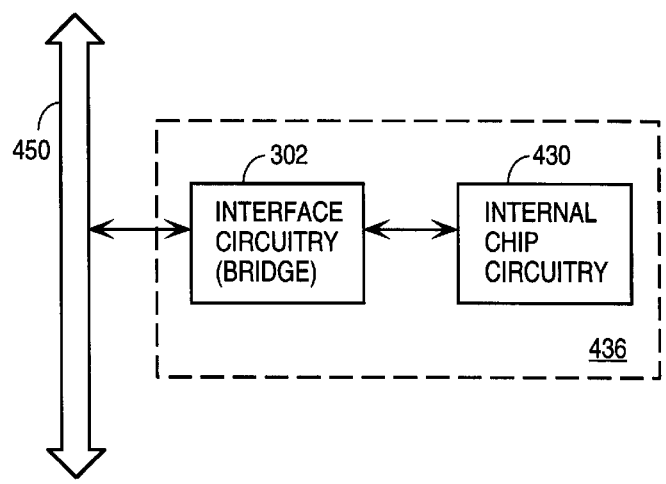
FIG. 4 shows another embodiment of the invention as interface circuitry in a PCI resource chip.

The above-described methods of handling read transactions by a bridge 302 may be performed by a bus-to-bus bridge 302 as in FIG. 3, where the initiator $I_1$ or $I_2$ is a device on the primary bus 326 and the target $T_1$ or $T_2$ is a device on the secondary bus 330 on the other side of the bridge. Alternatively, the methods may be performed by a device other than a bus-to-bus bridge, as shown in FIG. 4. In that embodiment, the methods are performed by a bridge 302 being in effect interface circuitry as part of a PCI resource chip 436, where the initiator is the bus 450 and the target is the internal chip circuitry 430.

To summarize, the embodiments of the invention described above are techniques that may help achieve reduced latency and an overall improvement in the performance of read transactions across a bridge. The embodiments described are, of course, subject to other variations in structure and implementation. For instance, the methods and structures described above can be readily applied to read transactions that are requested on either side of the bridge. Also, although the expected implementation of the bridge is in the form of hard-wired logic circuitry, the bridge may also be implemented using a programmed processor that has the performance needed for the particular system application. Contemplated system applications for the various embodiments of the invention include bridges, I/O processors, and I/O chip sets used in servers and work stations. It is intended that all such modifications and variations falling within the spirit and scope of the invention be covered by the appended claims.

What is claimed is:

1. A method of handling read transactions by a bridge, comprising:

receiving from an initiator on a first side of the bridge an initial request for an initial read transaction that targets read data;

receiving from the initiator on the first side of the bridge a subsequent request for a subsequent read transaction that targets said read data; and signaling one or more wait states to the initiator in response to the subsequent request, provided the initial transaction is being mastered on a second side of the bridge and a buffer for storing read data associated with the initial transaction does not contain a sufficient amount of said targeted read data.

2. The method of claim 1 further comprising after the signaling:

delivering some of said targeted read data to the initiator after the buffer contains the sufficient amount of read data.

3. A method of handling read transactions, comprising:

receiving from an initiator on a first side of a bridge an initial request for an initial read transaction that targets read data;

receiving from the initiator on the first side of the bridge a subsequent request for a subsequent read transaction that targets said read data; and signaling one or more wait states to the initiator in response to the subsequent request, provided a data buffer corresponding to the initial transaction contains at least a first amount of read data.

4. The method of claim 3 further comprising:

delivering read data from the buffer to the initiator in response to the subsequent request, provided the buffer contains at least a second amount of read data which is greater than the first amount.

5. The method of claim 4 wherein the first and second amounts are determined prior to receiving the initial request.

6. A method of handling read transactions by a bridge, comprising:

receiving an initial request for an initial read transaction from an initiator on a first side of the bridge;

enqueuing the initial transaction;

signaling a retry termination in response to the initial request;

receiving a subsequent request for a subsequent read transaction from the initiator, the subsequent transaction matching the initial transaction; and if the initial transaction is being mastered on a second side of the bridge and a buffer for storing read data associated with the initial transaction does not contain a sufficient amount of said read data, signaling one or more wait states to the initiator in response to the subsequent request.

7. The method of claim 6 further comprising delivering read data received from a target to the initiator in response to the subsequent request.

8. The method of claim 6 wherein for the subsequent request the initiator repeats the initial request.

9. The method of claim 6 wherein the initial and subsequent transactions are PCI delayed read transactions.

10. The method of claim 9 wherein the transactions are Memory Read Multiple (MRM) transactions directed at prefetchable addresses.

11. The method of claim 6 wherein the bridge is coupled between a first bus and a second bus, the initiator being a device on the first bus and the target being a device on the second bus.

12. The method of claim 6 wherein the bridge is part of interface circuitry of a PCI resource chip coupled to a bus, the target being peripheral circuitry of the PCI chip, and the initiator being the bus.

13. A bridge comprising:

a first interface;

a second interface;

a buffer coupled between the first and second interfaces for storing read data received from the second interface and to be delivered to the first interface; and logic circuitry coupled to the first and second interfaces and the buffer to:

receive an initial request for an initial read transaction from the first interface, the initial transaction targeting read data;

receive a subsequent request for a subsequent read transaction from the first interface, the subsequent transaction targeting said read data, signal one or more wait states through the first interface in response to the subsequent request, provided the initial transaction is being mastered by the second interface and the buffer has an insufficient amount of said targeted read data, and deliver read data from the buffer to the first interface in response to the subsequent request when the buffer contains a sufficient amount of read data.

14. The bridge of claim 13 further comprising a programmable register coupled to said logic circuitry to indicate the sufficient amount of read data.

15. A computer system comprising:

a first bus;

a processor coupled to the first bus;

a second bus;

a disk storage controller coupled to the second bus; and a bridge coupled between the first and second buses, the bridge to receive an initial request for an initial read transaction from the processor, the initial transaction targeting read data, receive a subsequent request for a subsequent read transaction from the host processor, the subsequent transaction targeting said read data, signal one or more wait states to the processor in response to the subsequent request, provided a data buffer for storing read data corresponding to the initial transaction contains at least a first amount of read data received from the storage controller, and if the buffer fills to at least a second amount of read data, deliver read data from the buffer to the processor in response to the subsequent request.

16. The system of claim 15 wherein the bridge is to signal one or more wait states in response to the subsequent request provided the data buffer contains no read data and the transaction is being mastered on the second bus.

* * * * *